United States Patent
Mohan

(10) Patent No.: US 8,379,729 B2
(45) Date of Patent: Feb. 19, 2013

(54) CONTENT ADAPTIVE ERROR LOCALIZATION TO IMPROVE QUALITY OF CORRUPTED VIDEO DATA STREAMS UPON DECODE

(75) Inventor: Manisha Agrawal Mohan, Hazrat Ganj (IN)

(73) Assignee: Texas Instruments Incorporated, Dallas, TX (US)

( * ) Notice: Subject to any disclaimer, the term of this patent is extended or adjusted under 35 U.S.C. 154(b) by 1125 days.

(21) Appl. No.: 12/275,709

(22) Filed: Nov. 21, 2008

(65) Prior Publication Data

US 2009/0141811 A1   Jun. 4, 2009

(30) Foreign Application Priority Data

Nov. 21, 2007   (IN) .............. 2721/CHE/2007

(51) Int. Cl.
*H04B 1/66* (2006.01)
(52) U.S. Cl. ......... 375/240.25; 375/240.12; 375/240.27; 380/217

(58) Field of Classification Search .......... 375/240.27, 375/240.25, 240.12; 380/217
See application file for complete search history.

(56) References Cited

U.S. PATENT DOCUMENTS

| 6,498,865 | B1* | 12/2002 | Brailean et al. ............ 382/239 |
| 6,816,194 | B2* | 11/2004 | Zhang et al. ............ 375/240.27 |
| 2002/0085637 | A1* | 7/2002 | Henning ............ 375/240.14 |
| 2005/0123047 | A1* | 6/2005 | Alvarez Arevalo et al. ............ 375/240.16 |

* cited by examiner

*Primary Examiner* — Eleni Shiferaw
*Assistant Examiner* — Paul Callahan
(74) *Attorney, Agent, or Firm* — Robert D. Marshall, Jr.; Wade James Brady, III; Frederick J. Telecky, Jr.

(57) ABSTRACT

A method of video decoding discards a context dependent number of bits following detection of an invalid symbol. In the preferred embodiment the number of discarded bits depends upon the product of a constant corresponding to the video encoding standard and the current slice type and the maximum of the average number of bits per macroblock of the current slice and a stored average number of bits per macroblock of a previous slice of the same coding type.

3 Claims, 3 Drawing Sheets

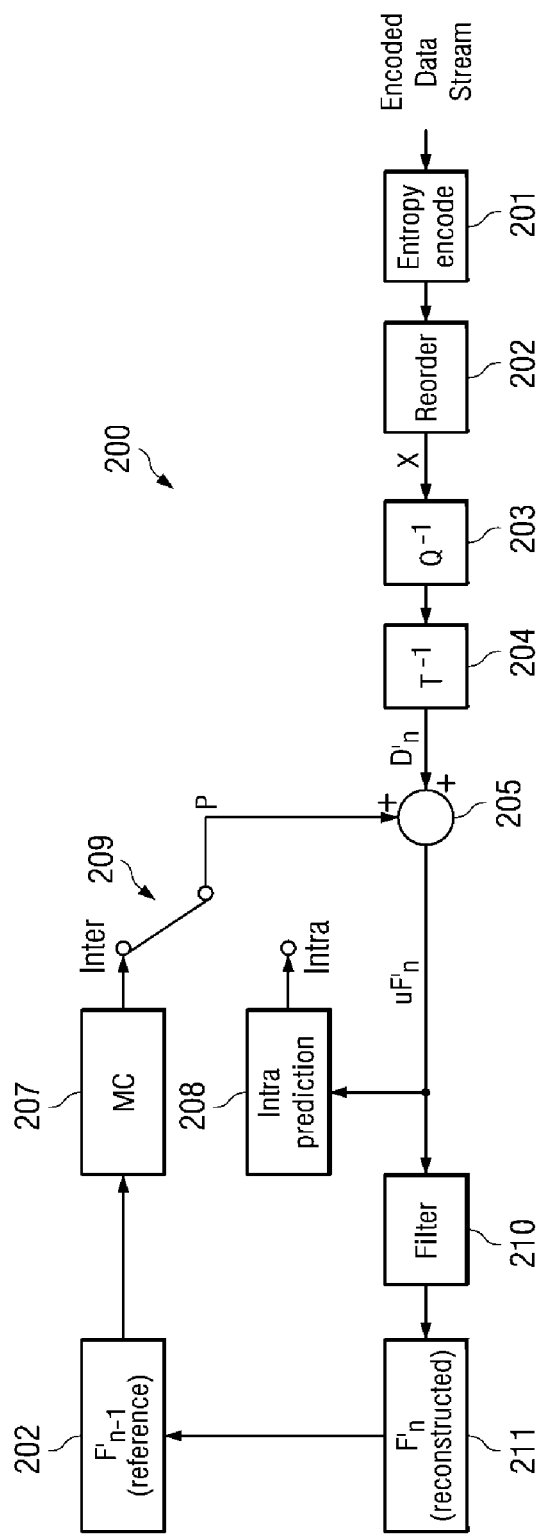
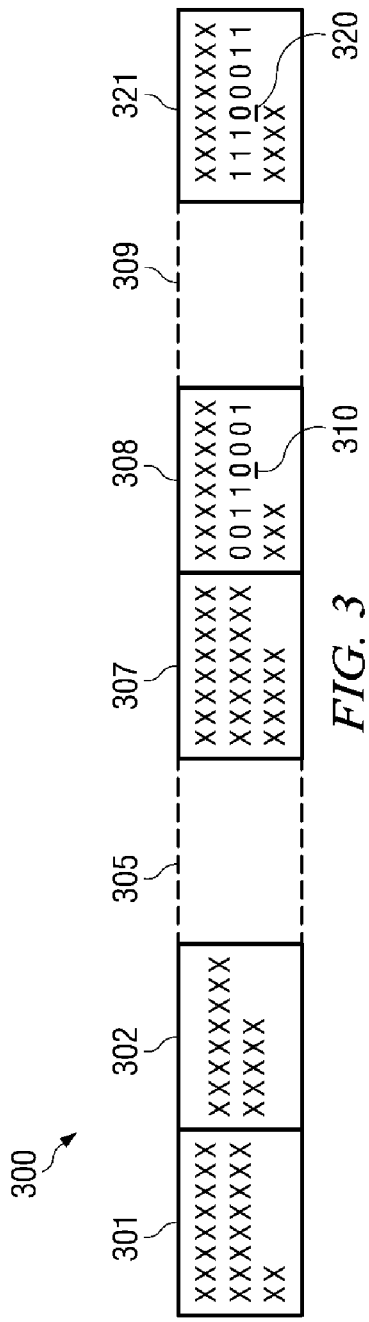
FIG. 2
(PRIOR ART)
FIG. 3

CONTENT ADAPTIVE ERROR LOCALIZATION TO IMPROVE QUALITY OF CORRUPTED VIDEO DATA STREAMS UPON DECODE

CLAIM OF PRIORITY

This application claims priority under 35 U.S.C. 119(a) to Indian Patent Application Serial No. 2721/CHE/2007 filed Nov. 21, 2007.

TECHNICAL FIELD OF THE INVENTION

The technical field of this invention is video decoding.

BACKGROUND OF THE INVENTION

Corruption of storage devices, such as corrupted DVD/CD disks, or channel transmission noise are common sources of bit errors in encoded video bitstreams. These bit errors are a serious problem in video decoding. Even one bit of corruption in the encoded stream can cause decoder to lose bitstream synchronization due to variable length coding (VLC) nature of the entropy encoding commonly used in video encoding. A single bit error can cause the decoder to fail to correctly decode further data from the error position to the next resynchronization marker (RM).

Corruption of the received video bitstream may result in any or all of three problems. The first problem is loss of bitstream synchronization. Loss of bitstream synchronization in the video decoder prevents correct syntax decoding from that point until the next RM. Corruption of the video bitstream may result in an incorrect state in the video decoder and display of incorrectly decoded data. This corruption may result in an incorrect state in the video decoder causing instability which may lead the video decoder to hang or crash. Finally, due to the presence of predicted regions and frames within a video bitstream any decoding error may result in error propagation into subsequent video frames. This error propagation may occur following video decoder resynchronization due to prediction from incorrect data.

Detection of corrupted data in video bitstreams on video decoding introduces a further problem. Due to the variable length codes a corrupted bit or bits may not be immediately detected. Video decoders typically detect bit corruption by detection of an invalid symbol. An invalid symbol may be detected by detection of an out of range value, an incorrect number of macroblocks or other illegal codeword. Detection of such an invalid symbol may be triggered directly by a corrupted bit. However, a corrupted bit may not immediately result in detection of an invalid symbol. Lots of bit errors in the stream remain undetectable due to variable length nature of the coded bitstream. A corrupted bit may cause the video decoder to determine that data following the corrupted bit are valid symbols. In this case the decoder will not detect the error though it will parse data following the corrupted bit incorrectly. This situation may prevail for an indeterminate length of time before the video decoder detects an invalid symbol.

Accordingly, detection of an invalid symbol makes any following data before the next resynchronization marker (RM) invalid. Prior art video decoders generally abort decoding in this case until the next resynchronization marker (RM). This results in loss of picture for this interval but avoids propagating errors. Because invalid symbol detection may occur long after the first corrupted bit in that slice, the authenticity of the bits before the error detection position back to previous RM is questionable. This is due to the uncertainty of the error location which may not the same location as that of error detection. Many video decoders drop all bits of that slice upon such error detection. A slice is an independently decodable unit including a resynchronization marker (RM) followed by the video encoded data until the next RM. Discarding an entire slice of data prevents displaying erroneously reconstructed macroblocks and propagating errors. However if the bit error rate is high of the order of $10^{-4}$ or $10^{-3}$ making it likely that every alternate picture is corrupted, throwing away good bits such as correctly decoded bits before the error position, results in very poor picture quality. The amount of good bits discarded upon error detection position can be controlled by inserting more than one RM per frame. The decision on the number of slices per frame is made at the video encoder. The video decoder has no control over it. When a frame is coded as a single slice even few corrupted bits per frame may result in loss of the entire frame.

Other video decoders assume that all data before the error detection is correct. This technique discards no valid data. However due to the location of the corrupted bit not necessarily being the location of the error detection, this technique results in decoding erroneous data. Errors caused by this erroneous decoding will generally propagate to later frames due to the use of prediction.

SUMMARY OF THE INVENTION

This invention improves the decoded picture quality for error streams by neither discarding all decoded bits of erroneous slice nor accepting all bits up to the detected error. This invention rejects only a specific number of bits before the detected error position. The number of bits before the detected error position rejected in the corrupted bitstream is variable and content dependent.

This invention tracks the average number of bits consumed per macroblock (MB) in previously decoded error free predicted (P) and independent (I) slices. Upon error detection this invention compares the average number of bits per MB of the currently decoded slice with the average number of bits per MB of previously decoded slices of the same type. Thus the average for a current erroneous I slice is compared with previously decoded I slices and the current average for a P slice is compared with previously decoded P slices. In one embodiment the number of bits to be rejected before the error detection point is given by:

$$\text{BitsToBeRejected} = \text{THm} * \text{Max}[A_{CS}, A_{PS}]$$

where: BitsToBeRejected is the number of bits before the error detection location to be discarded; $A_{CS}$ is the average number of bits per macroblock of the current slice; $A_{PS}$ is the average number of bits per macroblock of the prior slice of the same type; and THm is a constant. The value of THm depends upon the video coding standard and the entropy coding mode used by the encoder. Thus different values of THm apply to CAVLC and CABAC entropy coding mode in an H.264 video standard stream. Similarly different THm would be required for H.263, MPEG-4, MPEG-2 and MPEG-1 encoded streams.

Thus this invention controls the number of bits before error position that are rejected, thus keeping many good decoded bits to improve the picture quality.

BRIEF DESCRIPTION OF THE DRAWINGS

These and other aspects of this invention are illustrated in the drawings, in which:

FIG. 2 illustrates an overview of the video decoding process of the prior art;

FIG. 3 illustrates an example error detection; and

DETAILED DESCRIPTION OF PREFERRED EMBODIMENTS

Figure 1:
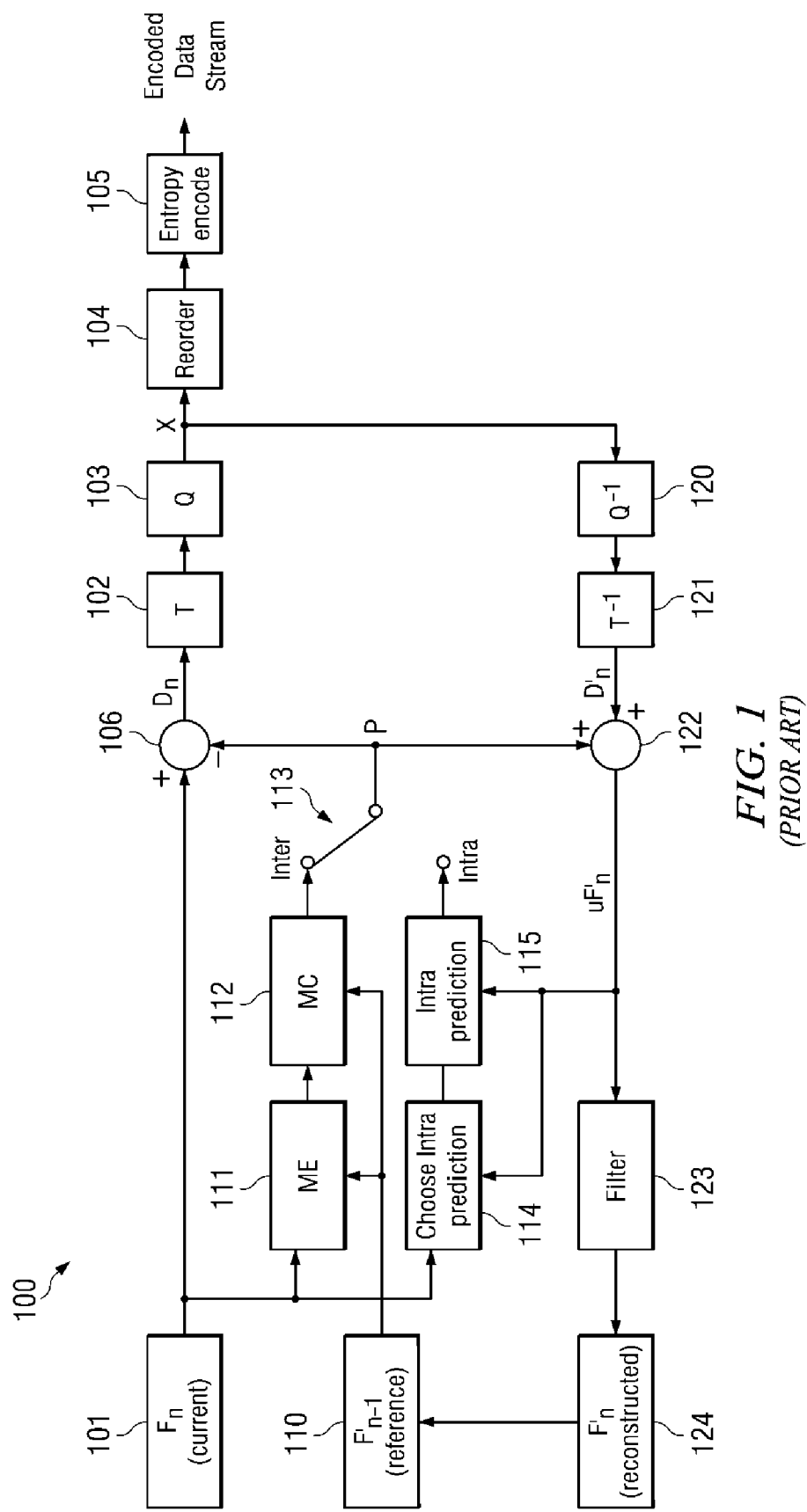
FIG. 1 illustrates an overview of the video encoding process of the prior art.

FIG. 1 illustrates the encoding process 100 of video encoding according to the prior art. Many video encoding standards use similar processes such as represented in FIG. 1. Encoding process 100 begins with the n th (current) frame $F_n$ 101. Frequency transform block 102 transforms a macroblock of the pixel data into the spatial frequency domain. This typically involves a discrete cosine transform (DCT). This frequency domain data is quantized in quantization block 103. This quantization typically takes into account the range of data values for the current macroblock. Thus differing macroblocks may have differing quantizations. In accordance with the H.264 standard, in the base profile the macroblock data may be arbitrarily reordered via reorder block 104. As will be explained below, this reordering is reversed upon decoding. Other video encoding standards and the H.264 main profile transmit data for the macroblocks in strict raster scan order. The quantized data is encoded by entropy encoding block 105. Entropy encoding employs fewer bits to encode more frequently used symbols and more bits to encode less frequency used symbols. This process reduces the amount of encoded that must be transmitted and/or stored. The resulting entropy encoded data is the encoded data stream.

Video encoding standards typically permit two types of predictions. In inter-frame prediction, data is compared with data from the corresponding location of another frame. In intra-frame prediction, data is compared with data from another location in the same frame.

For inter prediction, data from n-1 th (previous) frame $F_{n-1}$ 110 and data from the n th frame $F_n$ 101 supply motion estimation block 111. Motion estimation block 111 determines the positions and motion vectors of moving objects within the picture. This motion data is supplied to motion compensation block 112 along with data from n-1 th frame $F_{n-1}$ 110. The resulting motion compensated frame data is selected by switch 113 for application to subtraction unit 106. Subtraction unit 106 subtracts the inter prediction data from switch 113 from the input frame data from n th frame $F_n$ 101. Thus frequency transform block 102, quantization block 103, reorder block 104 and entropy encoding block 105 encode the differential data rather than the original frame data. Assuming there is relatively little change from frame to frame, this differential data has a smaller magnitude than the raw frame data. Thus this can be expressed in fewer bits contributing to data compression. This is true even if motion estimation block 111 and motion compensation block 112 find no moving objects to code. If the n th frame $F_n$ and the n-1 th frame $F_{n-1}$ are identical, the subtraction unit 106 will produce a string of zeros for data. This data string can be encoded using few bits.

The second type of prediction is intra prediction. Intra prediction predicts a macroblock of the current frame from another macroblock of the current frame. Inverse quantization block 120 receives the quantized data from quantization block 103 and substantially recovers the original frequency domain data. Inverse frequency transform block 121 transforms the frequency domain data from inverse quantization block 120 back to the spatial domain. This spatial domain data supplies one input of addition unit 122, whose function will be further described. Encoding process 100 includes choose intra predication unit 114 to determine whether to implement intra prediction. Choose intra prediction unit 114 receives data from n th frame $F_n$ 101 and the output of addition unit 122. Choose intra prediction unit 114 signals intra prediction intra predication unit 115, which also receives the output of addition unit 122. Switch 113 selects the intra prediction output for application to the subtraction input of subtraction units 106 and an addition input of addition unit 122. Intra prediction is based upon the recovered data from inverse quantization block 120 and inverse frequency transform block 121 in order to better match the processing at decoding. If the encoding used the original frame, there might be drift between these processes resulting in growing errors.

Video encoders typically periodically transmit unpredicted frames. In such an event the predicted frame is all 0's. Subtraction unit 106 thus produces data corresponding to the n th frame $F_n$ 101 data. Periodic unpredicted or I frames limits any drift between the transmitter coding and the receive decoding. In a video movie a scene change may produce such a large change between adjacent frames that differential coding provides little advantage. Video coding standards typically signal whether a frame is a predicted frame and the type of prediction in the transmitted data stream.

Encoding process 100 includes reconstruction of the frame based upon this recovered data. The output of addition unit 122 supplies deblock filter 123. Deblock filter 123 smoothes artifacts created by the block and macroblock nature of the encoding process. The result is reconstructed frame $F'_n$ 124. As shown schematically in FIG. 1, this reconstructed frame $F'_n$ 124 becomes the next reference frame $F_{n-1}$ 110.

FIG. 2 illustrates the corresponding decoding process 200. Entropy decode unit 201 receives the encoded data stream. Entropy decode unit 201 recovers the symbols from the entropy encoding of entropy encoding unit 105. This invention is applicable to CABAC decoding. Reorder unit 202 assembles the macroblocks in raster scan order reversing the reordering of reorder unit 104. Inverse quantization block 203 receives the quantized data from reorder unit 202 and substantially recovers the original frequency domain data. Inverse frequency transform block 204 transforms the frequency domain data from inverse quantization block 203 back to the spatial domain. This spatial domain data supplies one input of addition unit 205. The other input of addition input 205 comes from switch 209. In inter prediction mode switch 209 selects the output of motion compensation unit 207. Motion compensation unit 207 receives the reference frame $F'_{n-1}$ 206 and applies the motion compensation computed by motion compensation unit 112 and transmitted in the encoded data stream.

Switch 209 may also select an intra prediction mode. The intra prediction is signaled in the encoded data stream. If this is selected, intra prediction unit 208 forms the predicted data from the output of adder 205 and then applies the intra prediction computed by intra prediction block 115 of the encoding process 100. Addition unit 205 recovers the predicted frame. As previously discussed in conjunction with encoding, it is possible to transmit an unpredicted or I frame. If the data stream signals that a received frame is an I frame, then the predicted frame supplied to addition unit 205 is all 0's.

The output of addition unit 205 supplies the input of deblock filter 210. Deblock filter 210 smoothes artifacts created by the block and macroblock nature of the encoding process. The result is reconstructed frame $F'_n$ 211. As shown schematically in FIG. 2, this reconstructed frame $F'_n$ 211 becomes the next reference frame $F'_{n-1}$ 206.

The deblocking filtering of deblock filter 123 and deblock 210 must be the same. This enables the decoding process to accurately reflect the input frame $F_n$ 101 without error drift. The H.264 standard has a specific, very detailed decision matrix and corresponding filter operations for this process. The standard deblock filtering is applied to every macroblock in raster scan order. This deblock filtering smoothes artifacts created by the block and macroblock nature of the encoding. The filtered macroblock is used as the reference frame in predicted frames in both encoding and decoding. The encoding and decoding apply the identical processing the reconstructed frame to reduce the residual error after prediction.

There could be many sources for video bitstream corruption. For storage devices such as DVDs or CDs, there could be scratches on the surface or even corrupted data on the disk. The video bitstream could be corrupted by transmission errors including things like a noisy optical transmission link. A video bitstream may be corrupted with random errors, block loss or burst errors depending on the channel. In packet networks block loss is the primary source of error. Mediation of the damage from a corrupted video bitstream includes error detection, discarding bits until resumption of normal decoding and concealing the corrupted output.

Error resilience for video decoding includes three key components: error detection; error recovery; and error concealment. One weak component can result in poor performance despite the strengths of the other two components. For example errors not detected cannot be concealed. Slow error recovery would result in discarding good data and requiring unnecessary concealment. Finally, poor concealment can degrade quality, while an better concealment may better predict missing data. Thus improvement in error recovery may cooperate with error detection and error concealment to improve perceived video quality.

FIG. 3 illustrates an example error detection. Video bitstream 300 includes macroblocks 301, 302, 307, 308 and 321. Video bitstream 300 also includes gaps 305 and 309 representing plural macroblocks. As noted above macroblocks 301, 302, 307, 308 and 321 have varying numbers of bits in accordance with the variable length coding of the encoded video bitstream 300. The number of bits indicated in FIG. 3 is exemplary only and does not imply a requirement for any particular number of bits.

Video bitstream 300 includes error location 310. The bit 0 in macroblock 309 is shown in bold and underline. This corruption may represent an erroneous changed bit, omission of a bit or inclusion of one or more extra bits. In accordance with the error detection used in the prior art, the error is not detected until error detection location 320. The reasons for such a delayed detection are noted above.

Figure 4:
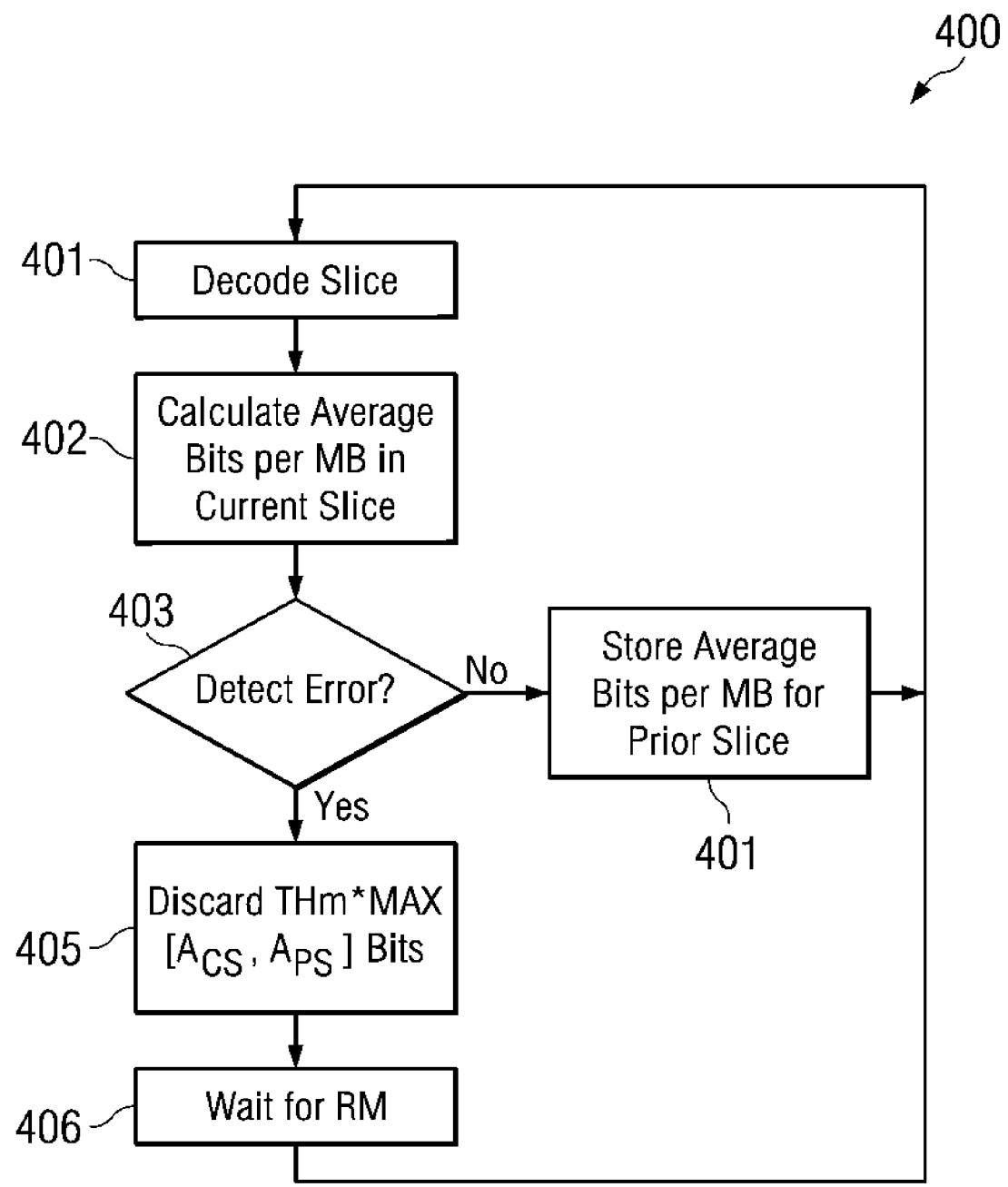
FIG. 4 illustrates a simplified flow chart of the method of this invention.

FIG. 4 illustrates a simplified flow chart of method 400 of this invention. Method 400 begins with step 401 which decodes the next slice of video bitstream data. As noted above a slice of data is marked by pair of resynchronization markers. Step 402 calculates the average number of bits per macroblock of the current slice $A_{CS}$. Step 403 determines if an error is detected in the current slice. As noted above this error detection is typically made by detection of an invalid symbol. If no error was detected in the current slice (No at step 403), then the average number of bits per macroblock of the current slice $A_{CS}$ is stored as the average number of bits per macroblock of the prior slice $A_{PS}$. As will be described below, this average number of bits per macroblock of the prior slice $A_{PS}$ will be used in error localization. Upon storing the average number of bits per macroblock of the prior slice $A_{PS}$, method 400 returns to step 401 to decode the next slice.

If an error was detected in the current slice (Yes at step 403), then error localization begins. Step 405 discards some bits received before the error detection location 320. The amount of data discarded depends upon the context. The amount of data before the error detection location is determined by the equation:

$$\text{BitsToBeRejected} = \text{THm} * \text{Max}[A_{CS}, A_{PS}]$$

where: BitsToBeRejected is the number of bits before the error detection location to be discarded; $A_{CS}$ is the average number of bits per macroblock of the current slice; $A_{PS}$ is the average number of bits per macroblock of the prior slice of the same type; and THm is a constant. The value of THm depends upon the video coding standard and the entropy coding mode used by the encoder. Thus different values of THm apply to CAVLC and CABAC entropy coding mode in an H.264 video standard stream. Similarly different THm would be required for H.263, MPEG-4, MPEG-2 and MPEG-1 encoded streams. In addition, the value of THm would depend upon the type of macroblock, such as one value for an intra-predicted macroblock and another value for an inter-predicted macroblock.

The constant THm is empirically determined for each case. This determination determines the probability of error propagation for the particular video encoding type and slice type. Because of temporal and spatial prediction in many video coding techniques, the probability of propagating errors to additional macroblocks in the current frame and future frames may be more serious than an incorrect display directly attributable to decoding corrupted data. For example, the probability of error propagation in Huffman coding is less than the probability of error propagation in arithmetic coding such as content adaptive binary arithmetic coding (CABAC). The probability of error propagation in temporal predictive (P) frames is greater than for intra (I) frames. Table 1 lists several video coding types and values of THm found suitable.

TABLE 1

| Video Coding Standard | Entropy Coding Type | THm for Intra Slices | THm for Inter Slices |
|---|---|---|---|
| H.264 | Huffman | 2 | 3 |
| MPEG-4 | Huffman | 4 | 5 |

Thus the number of bits discarded in this invention depends upon the video coding type through the constant factor THm and upon the individual statistics of the current video through the average number of bits per macroblock of the prior slice of the same type $A_{PS}$ and the average number of bits per macroblock of the current slice $A_{CS}$. Step 406 waits for the next resynchronization marker before returning to decode the next slice in step 401.

The technique of this invention is called error localization. This invention attempts to limit the data discarded upon an invalid signal detection to better match the actual amount of undecodable data due to the data corruption than prior art techniques. The two major prior art techniques make opposite and often equally bad assumptions. A first prior art technique discards all data back to the last resynchronization marker. This prior art technique ensures that no corrupted data is used. However, this first prior art technique often discards good data. In the worst case where an error is detected at the end of slice, discarding back to the last resynchronization marker would discard nearly an entire slice of data. A second major prior art technique retains all date up to the detected error location. This ensures retention of all good data. However, because the corrupted bit location is before and often long before the detected error location, this second prior art technique retains erroneous data. Using this second prior art technique would often display a macroblock with an erroneous color which could be of any arbitrary color. The damage of retaining such erroneous data is not confined to the current slice. Erroneously decoded macroblocks propagate errors to all future predicted frames in that group of block (GOB) because video coding uses the temporal prediction.

This invention attempts to retain as much good data as possible. The number of bits discarded in this invention is adaptive. The invention is sensitive to both the bitrate and contents when deciding how many bits to reject. This invention keeps the optimum number of decoded bits and rejects only the bits suspected to be corrupted because of this adaption for the content type.

The proposed approach improves average PSNR of decoded YUV for error streams by 2.9 db. Average was computed over 200 min of erroneous CIF stream corrupted using ITU-T WCDMA error patterns at $10^{-4}$ bit error rate. For $10^{-3}$ bit error rate, average PSNR improved by 2.2 db. Subjective quality of the decoded picture was as well found to be improved in player playing above corrupted streams after using our solution of error localization.

What is claimed is:

1. A method of video decoding comprising:
receiving an encoded video data stream;
for each slice of video data between consecutive resynchronization markers
decoding said encoded video data into displayable macroblocks,
calculating an average number of bits per decoded displayable macroblock for the current slice,
searching for invalid symbols due to errors caused by data corruption in the encoded video data stream,
upon detecting an invalid symbol discarding a context dependent number of decoded bits before a location of said invalid symbol detection, and
upon detecting no invalid symbols storing said calculated average number of bits per decoded displayable macroblocks and considering a next slice of the encoded video data stream;
said step of discarding a context dependent number of decoded bits includes determining the number of bits to be discarded as $$\text{BitsToBeRejected} = \text{THm} * \text{Max}[A_{CS}, A_{PS}]$$

where: BitsToBeRejected is the number of bits before the error detection location to be discarded; $A_{CS}$ is the average number of bits per macroblock of the current slice; $A_{PS}$ is the stored average number of bits per macroblock; and THm is a constant.

2. The method of claim 1, wherein:
$A_{PS}$ is the stored average number of bits per macroblock for a frame type the same as a frame type encompassing the current slice.

3. The method of claim 1, wherein:
THm is dependent upon the frame type of a frame encompassing the current slice.

* * * * *